(12) United States Patent
Marler et al.

(10) Patent No.: US 7,184,259 B2
(45) Date of Patent: Feb. 27, 2007

(54) PORTABLE ENTERTAINMENT DEVICE

(75) Inventors: Terry Marler, Goodrich, MI (US); Jin Hyejung Palmer, Waterford, MI (US); Vincent L. Brooks, Troy, MI (US); Sherry N. Phillips, Mayville, MI (US)

(73) Assignee: Delphi Technolgies, Inc., Troy, MI (US)

( * ) Notice: Subject to any disclaimer, the term of this patent is extended or adjusted under 35 U.S.C. 154(b) by 240 days.

(21) Appl. No.: 10/818,978

(22) Filed: Apr. 6, 2004

(65) Prior Publication Data

US 2005/0219808 A1 Oct. 6, 2005

(51) Int. Cl.
*G06F 1/16* (2006.01)
*A47B 21/00* (2006.01)

(52) U.S. Cl. .......................... 361/679; 702/19; 368/12

(58) Field of Classification Search ........ 361/679–687, 361/724–727; 312/223.1–223.6; 702/19; 368/12; 463/43
See application file for complete search history.

(56) References Cited

U.S. PATENT DOCUMENTS

| | | | |
|---|---|---|---|
| 4,131,851 A | 12/1978 | Martiny et al. | |
| 5,033,804 A * | 7/1991 | Faris | 312/223.3 |
| 5,339,362 A | 8/1994 | Harris | |
| 5,546,273 A | 8/1996 | Harris | |
| 5,832,388 A | 11/1998 | Williams et al. | |
| 6,055,478 A | 4/2000 | Heron | |
| 6,579,185 B1 * | 6/2003 | Honda et al. | 463/43 |
| 2002/0050384 A1 | 5/2002 | Schoop et al. | |
| 2002/0131759 A1 | 9/2002 | Lakhansingh | |
| 2003/0198137 A1 * | 10/2003 | Gorden | 368/12 |
| 2004/0049355 A1 * | 3/2004 | Maus et al. | 702/19 |

FOREIGN PATENT DOCUMENTS

| | | |
|---|---|---|
| DE | 19907549 | 9/2000 |
| DE | 10147278 | 4/2003 |
| GB | 2315186 | 1/1998 |
| GB | 2375683 | 11/2002 |

* cited by examiner

*Primary Examiner*—Hung Van Duong
(74) *Attorney, Agent, or Firm*—Scott A. McBain (57) ABSTRACT

A portable entertainment device including a right bay, a center bay and a left bay. The right and left bays are used to house the electrical speakers used in the portable entertainment device and the center bay is used to house both permanently mounted electronics and electronic modules which can be shared between the portable entertainment device and an automotive vehicle. Modules such as satellite receivers, DVD players, MP3 players and the like can comprise the portable modules. The right bay, center bay and left bay are integrated by way of a tubular structure wherein tubular structure forms inner chambers which are used to accommodate batteries, electrical power cords, and can also function as the pressure equalization port for a woofer style speaker housed in one of the bays.

11 Claims, 10 Drawing Sheets

PORTABLE ENTERTAINMENT DEVICE

TECHNICAL FIELD

This invention generally relates to portable entertainment devices and more particularly relates to portable entertainment devices with removable modules.

BACKGROUND OF THE INVENTION

Portable entertainment devices are known in the art. For example, U.S. Publication No. US 2002/0131759A1 discloses a portable entertainment apparatus for writing onto a compact disc and other permanent storage medium. A touch sense screen is used to display and select menu graphic choices such as listening to the radio or a CD, or the like.

Also known in the art are radio-signal receivers with plug-in modules. For example, U.S. Pat. No. 4,131,851 discloses a receiver for radio signals, including an R-F unit, and an A-F unit. The receiver includes contacts for receiving one or more modules to work in conjunction with the A-F unit and the R-F unit.

Also known in the art are portable radio telephone devices adapted to receive a variety of other portable devices. For example, U.S. Pat. No. 5,832,388 shows a portable radio telephone device which is capable of accepting any one of a plurality of electronic modules including a home security system, an emergency telephone, a global positioning satellite receiver, an electronic address book, a video phone, a facsimile scratch pad, a messaging billboard, a video camera, a memory device, and a smart card.

Although consumers enjoy the convenience and use of the above-referenced electronic devices, they each have their drawbacks. For example, the portable modules used by each electronic device is not compatible with other electronic devices. Thus, the electronic modules are only suitable for use in one device. Another problem with the above-referenced device is that many of them are not designed for ease of use and operation.

Accordingly, there is a need for a portable entertainment device which is easy to operate and employs electronic modules which can be used in other devices.

DETAILED DESCRIPTION OF THE INVENTION

Figure 1:
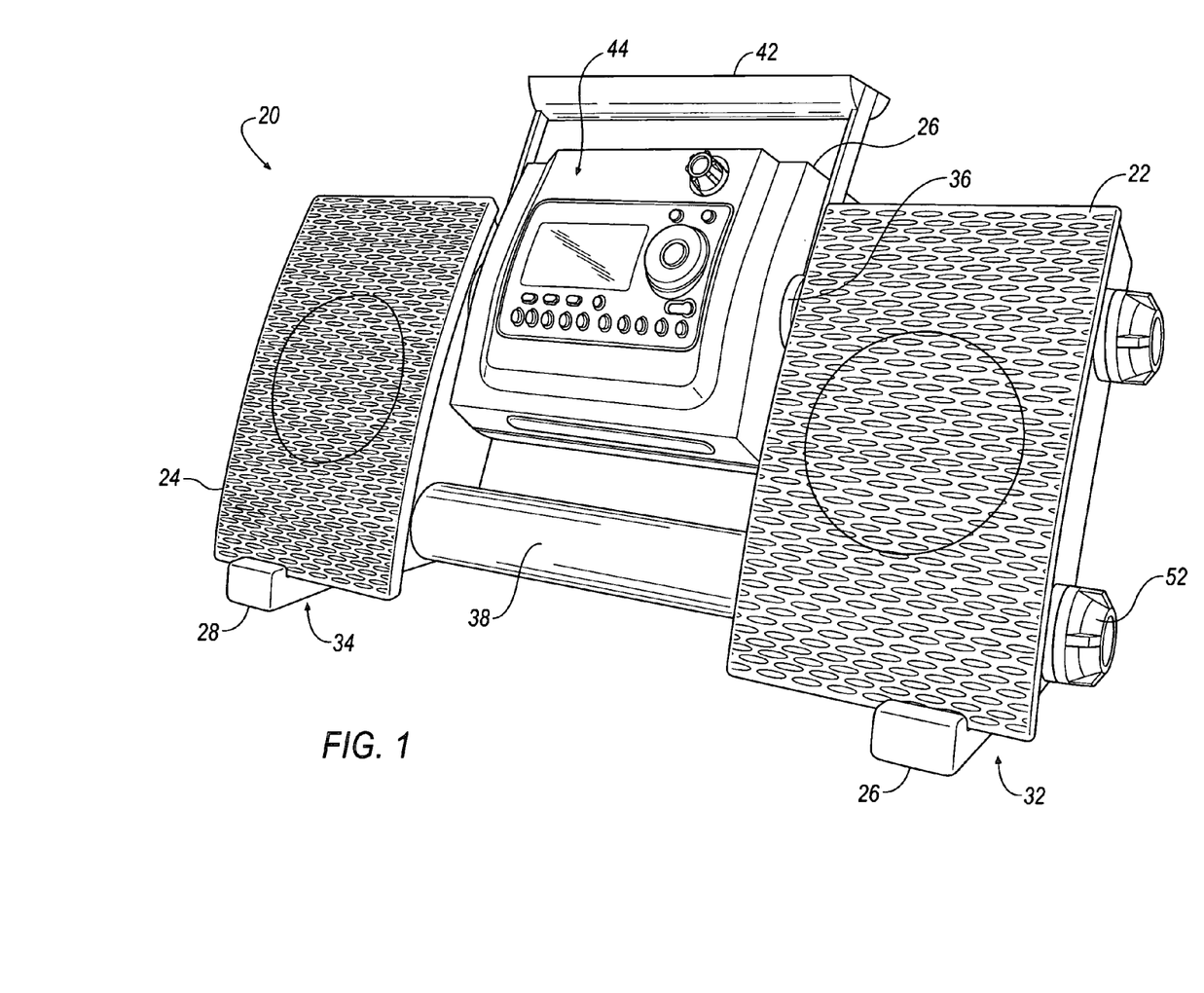
FIG. 1 is a front perspective view of the portable entertainment device of the present invention.

Now referring to FIG. 1, the portable entertainment device of the present invention 20 includes right bay 22, left bay 24 and center bay 26. Right bay 22 and left bay 24 are supported by stanchions 26, 28 respectively. Stanchions 26, 28 have a relatively flat bottom portion 32, 34 which is adapted to engage a relatively flat surface (such as a table or the like) used to support portable entertainment device 20.

Right bay 22 and left bay 24 are connected to one another by way of upper tube 36 (only partially in view in FIG. 1) and lower tube 38. Upper tube 36 is discontinuous in its central region and terminates on alternate sides of center bay 26. Upper tube 36 is pivotally connected to center bay 26 such that center bay 26 pivots about upper tube 36, preferably in at least 180 degrees of rotation. FIG. 12 depicts this pivoting 40 capability of center bay 26.

Figure 2:
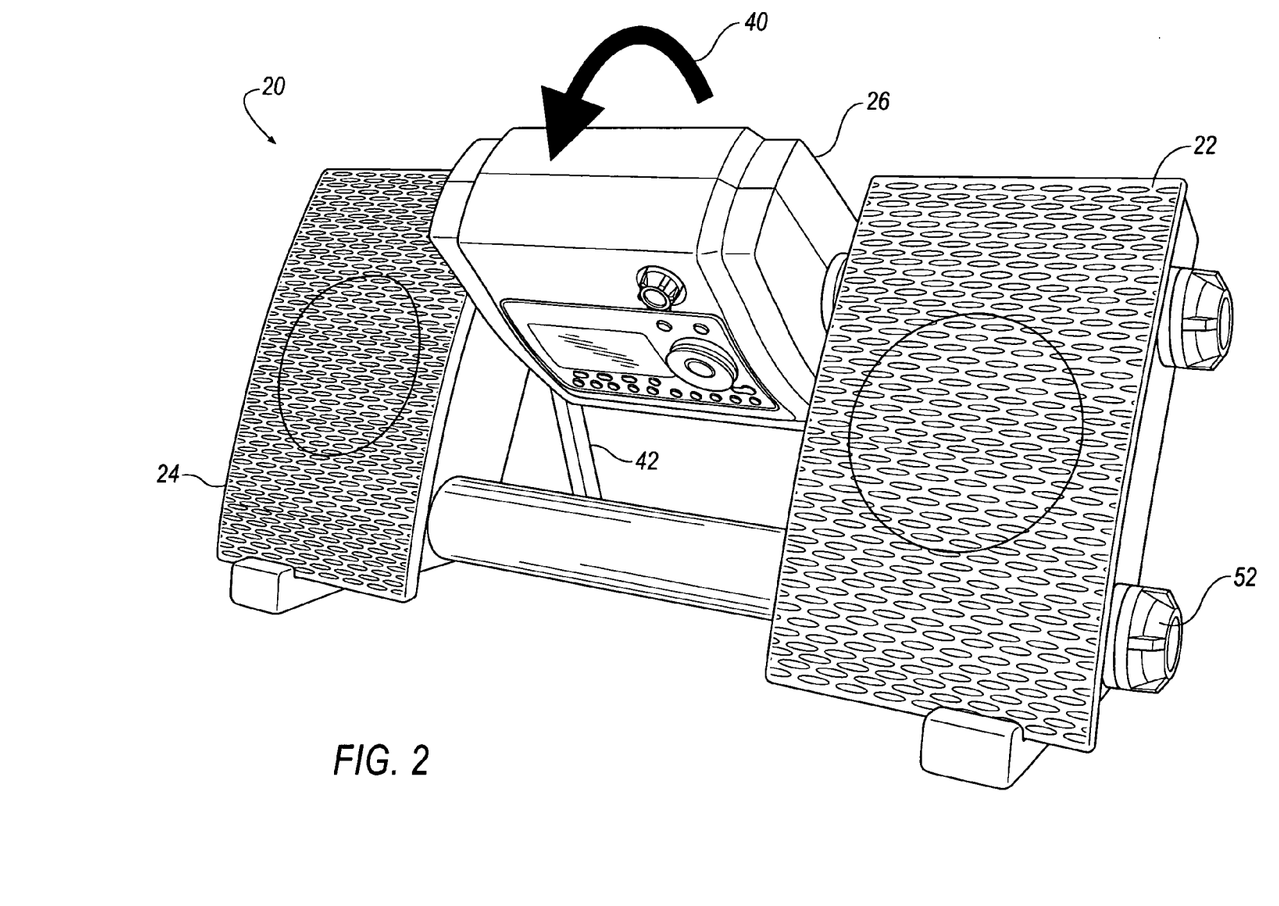
FIG. 2 is a front perspective view of the portable device of the present invention showing the pivoting capability of the center bay.
Figure 3:
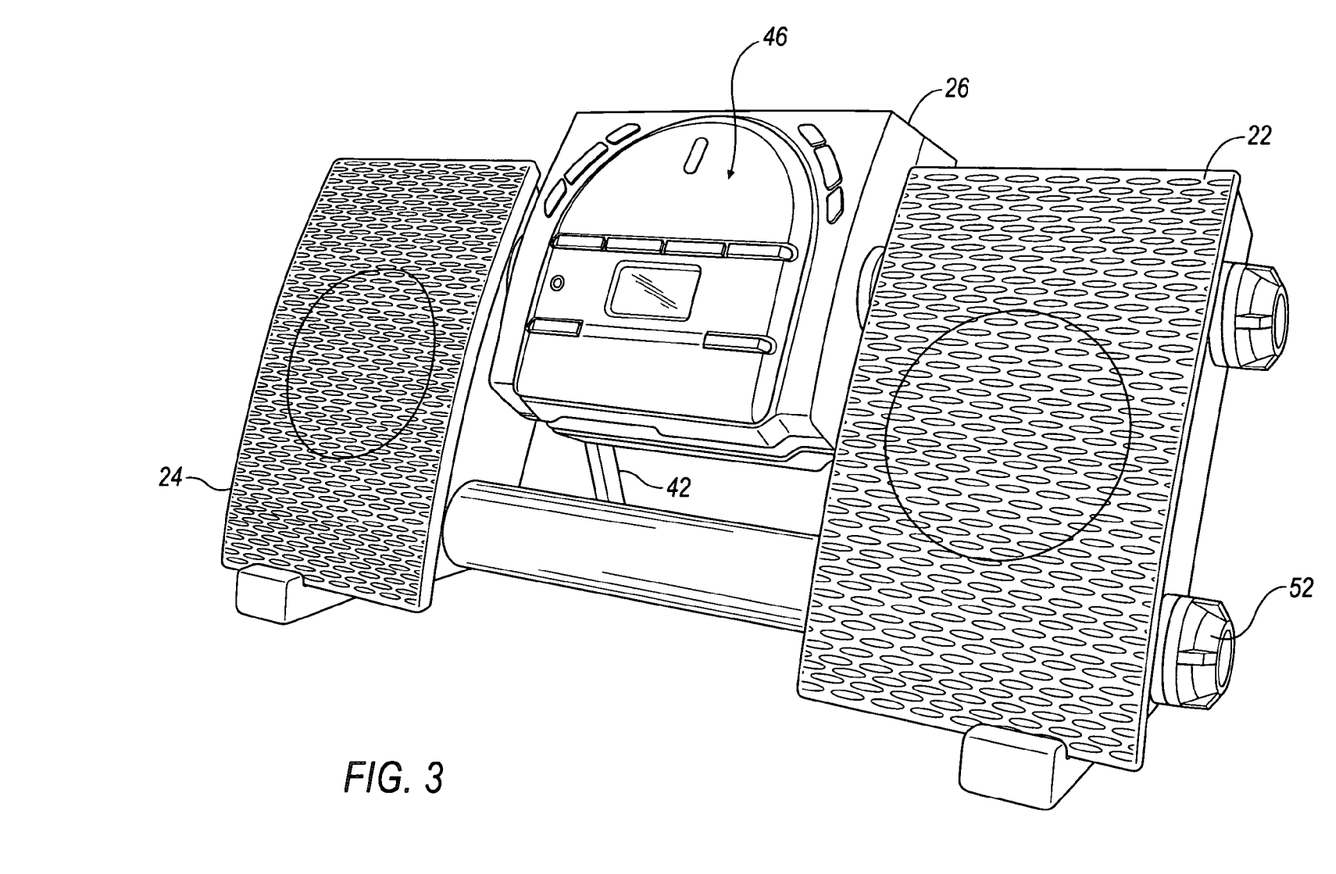
FIG. 3 is a front perspective view of the portable entertainment device of the present invention wherein the center bay has been rotated 180 degrees.

Now referring to FIGS. 1, 2, and 3, center bay 26 includes carrying handle 42 which is pivotally mounted to upper tube 36. Carrying handle is freely rotatable from a deployed position (see FIG. 1) into a stored position (see FIG. 2).

Center bay 26 includes a first face 44 (seen in FIG. 1) and a second face 46 (seen in FIG. 3). First face 44 and second face 46 are preferably opposite faces of center bay 26. However, the present invention contemplates that first face 44 and second face 46 do not need to be located opposite one another. For example, if center bay 26 was fabricated with a cubic cross-section it would provide four faces, each of which could be used for an interface (wherein first and second face 44, 46 could be adjacent to one another).

First face 44 can be used to interface with any number of permanently mounted electronic devices such as an MP3 player, a CD player, an AM/FM radio tuner, a cassette tape player, or the like. The opposite face 46 is designed to accept and to interface a variety of electronic modules. Specifically, electronic modules such as a satellite radio plug-in are specifically suited for portable entertainment device 20 inasmuch as they can be removed from the user's automobile (when the automobile is not in use) and deployed into portable entertainment device 20 for use outside of the vehicle. In addition to satellite radio plug-in module 48 (see FIG. 4), it is contemplated that other plug-in modules can be accommodated by center bay 26 such as a DVD player module 50 (see FIG. 4 and FIG. 5) or the like.

Figure 5:
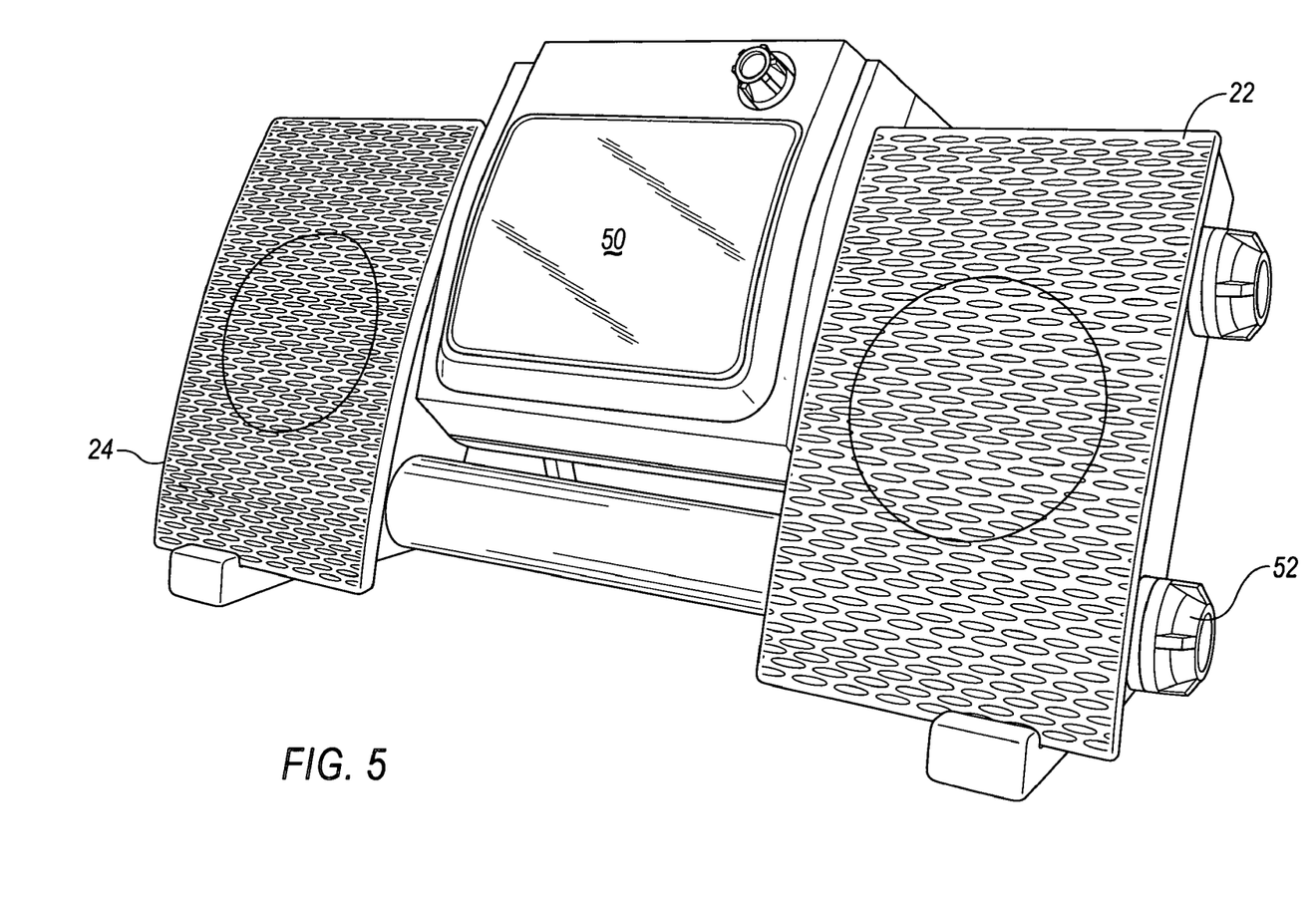
FIG. 5 is a front perspective view of the portable entertainment device of the present invention showing the center bay having a video display module installed therein.

Because center bay 26 is pivotally movable about upper tube 36, DVD player module 50 can be rotatably positioned for the viewer's optimum viewing convenience.

Figure 4:
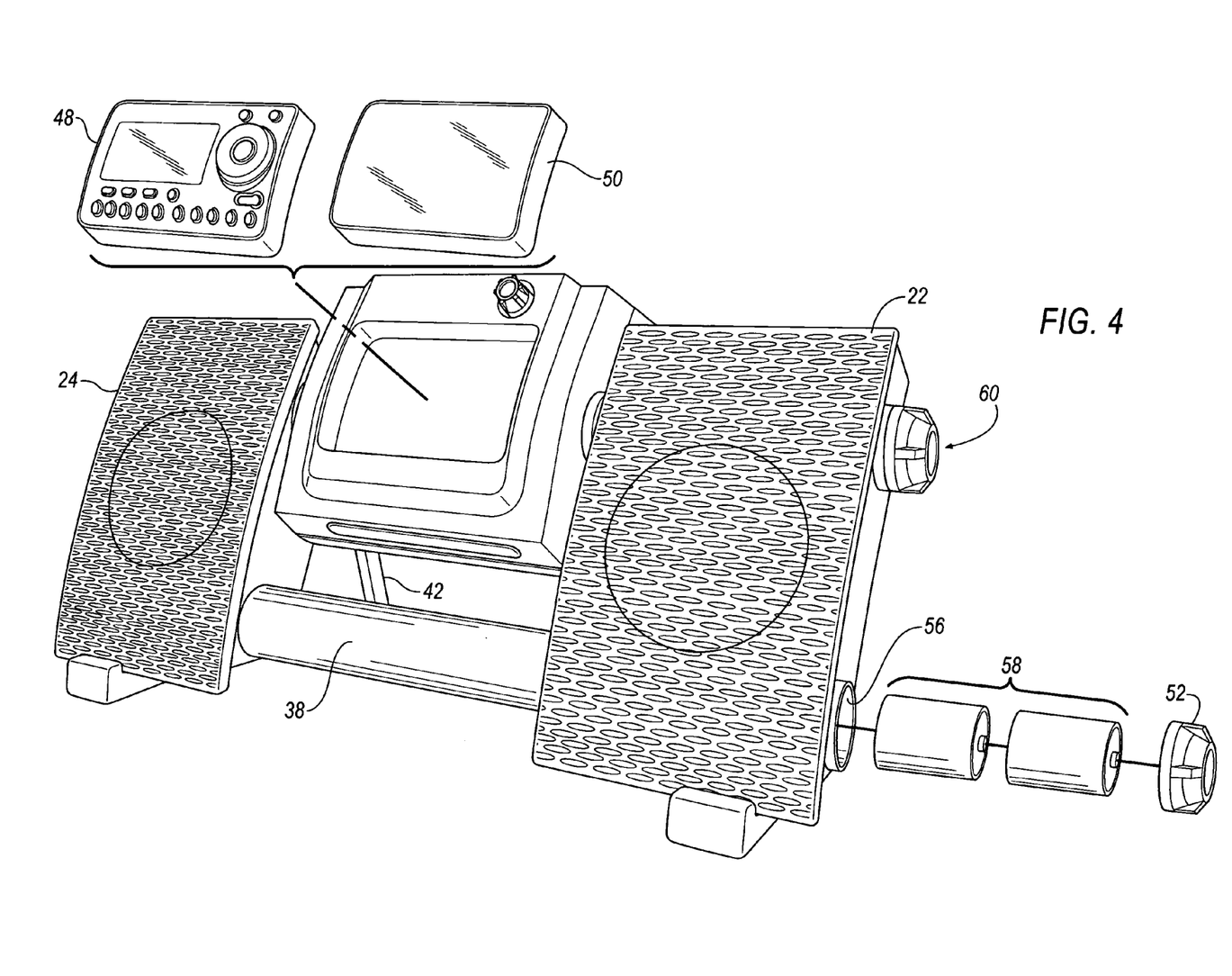
FIG. 4 is a front perspective view of the portable entertainment device of the present invention showing the ability of the center bay to accommodate various electronic modules.

Now referring to FIG. 4, lower tube 38 includes at least one removable cap 52 which is threaded, clipped, or otherwise removable from an end portion 54 of lower tube 38. Lower tube 38 includes an inner chamber 56 for enclosing one or more batteries 58 for powering portable entertainment device 20 under conditions where non-battery power sources are not available. The opposite end of lower tube 38 (not shown) can also be fitted with a removable end cap 52' which conceals inner chamber 56'. Inner chamber 56' can be used to conceal an AC line cord for use in powering portable entertainment device 20 when there is access to non-battery sources of electrical power.

Right bay 22 and left bay 24 contain open center portions (not shown) for accommodating the speakers associated with the portable entertainment device 20. In high performance systems, it is contemplated that some speakers (tweeters) will be used to reproduce high frequency sounds and low frequency speakers (woofers), will be used to replicate low frequency sounds. It is common in systems that use woofers, to include an equalization port on a back side of the woofer in order to equalize the air pressure differential across the speaker diaphragm during speaker diaphragm movement. Cap 60 covers an end portion of upper tube 36. Cap 60 can be fashioned with a hole, or a screened covered vent wherein the screen allows for the passage of air therethrough. If cap 60 is designed in this fashion, it can easily serve as an air equalization port to a woofer speaker housed in right bay 22. If such a porting arrangement is implemented, inner chamber 60' (not shown) of upper tube 36, will have to be ported to the open center portion of the bay that accommodates the woofer speaker.

In a preferred embodiment, upper tube 36, and lower tube 38 are comprised of metal.

Figure 6:
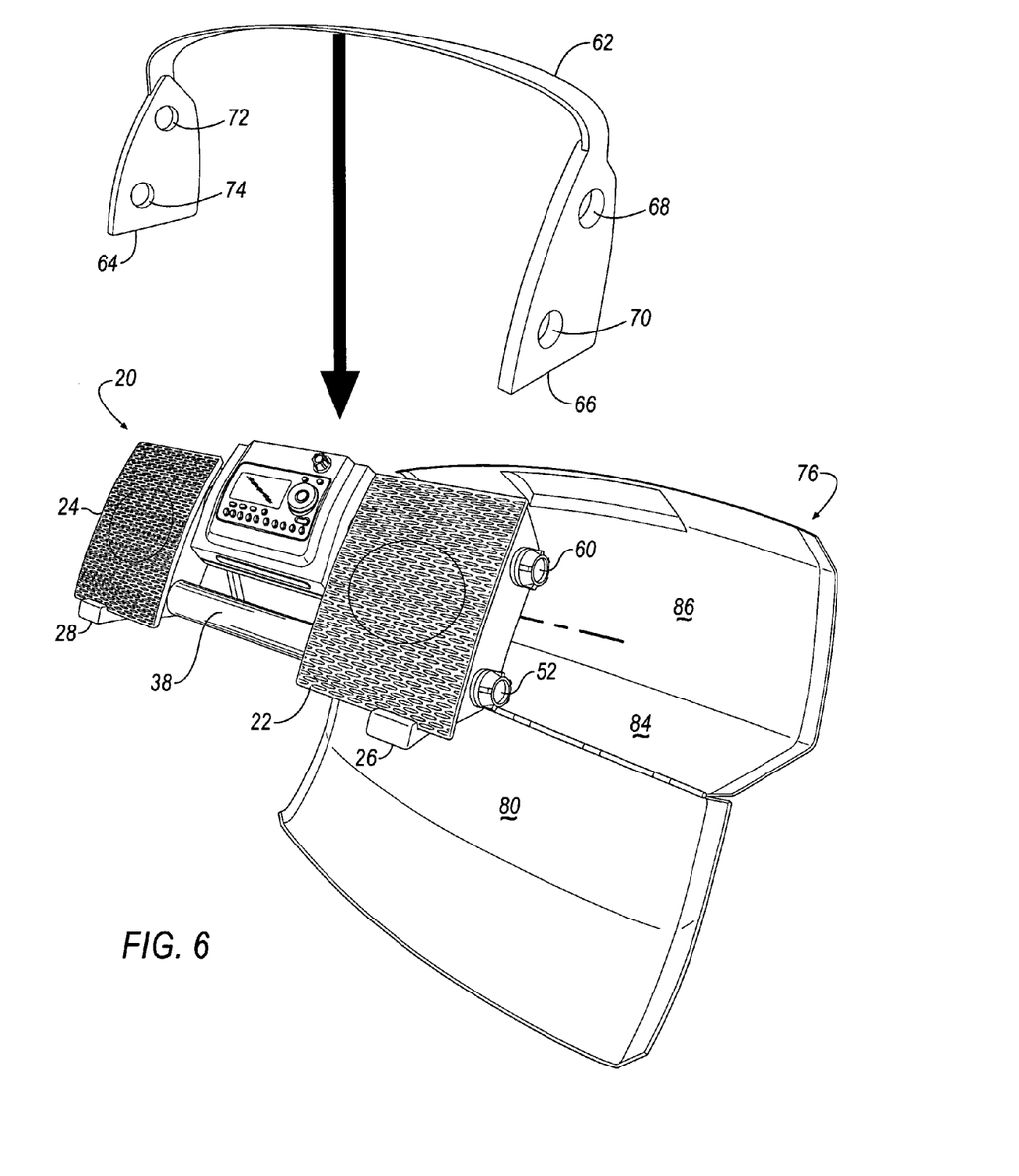
FIG. 6 is a front perspective view of the portable entertainment device of the present invention showing a detachable carrying handle and a removable clam shell cover.
Figure 7:
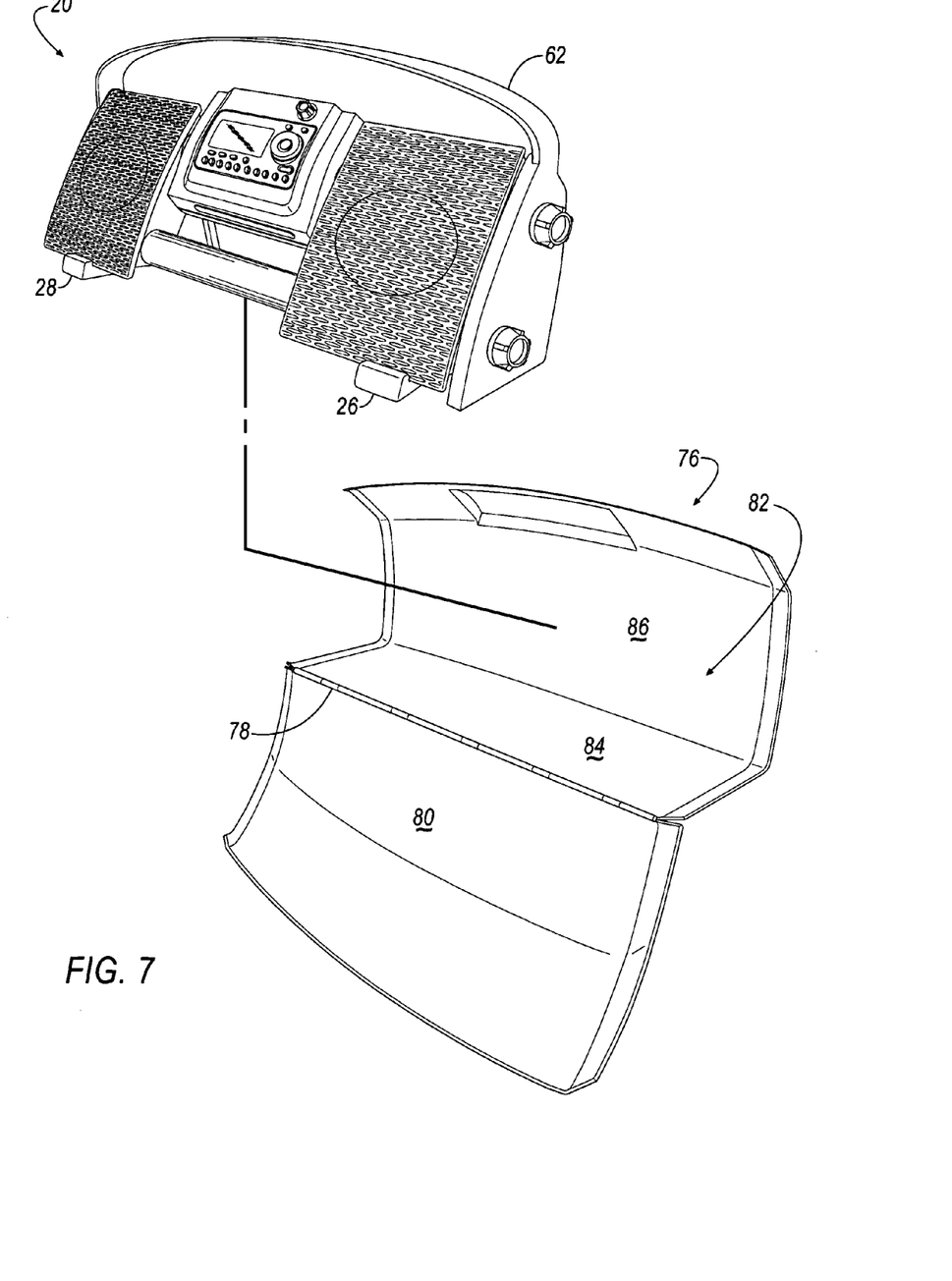
FIG. 7 is a front perspective view of the portable entertainment device of the present invention showing the portable carrying handle attached to the entertainment device.
Figure 8:
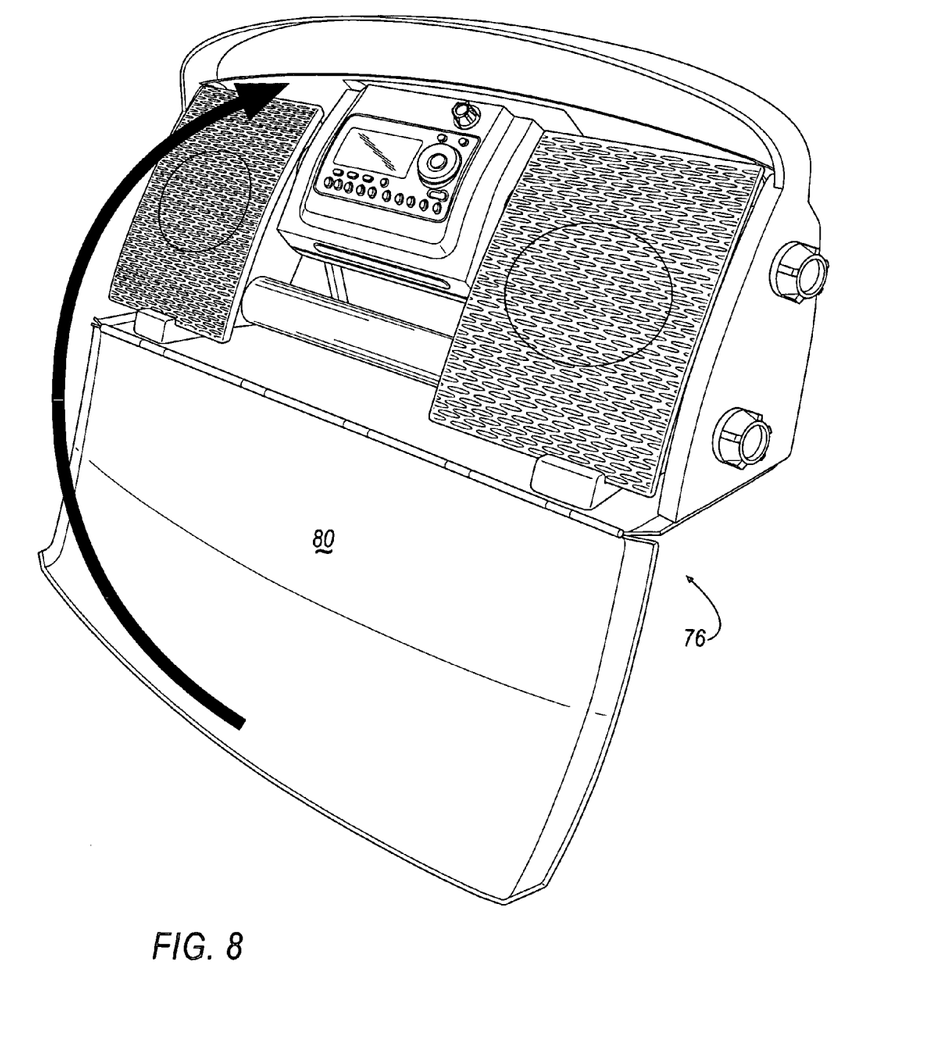
FIG. 8 is a front perspective view of the portable entertainment device of the present invention showing the portable entertainment device partially enclosed in a clam shell case.
Figure 9:
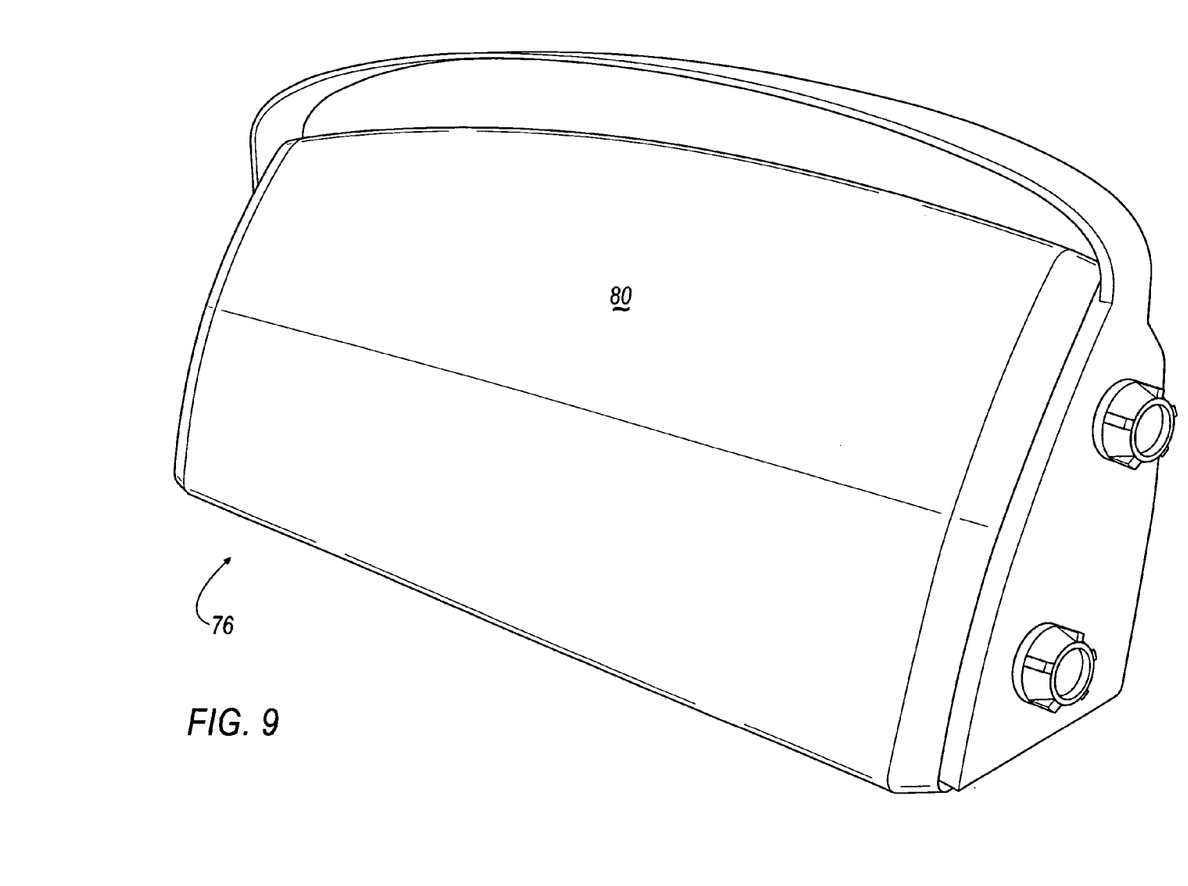
FIG. 9 is a front perspective view of the portable entertainment device of the present invention showing the portable entertainment device completely enclosed by the clam shell case.
Figure 10:
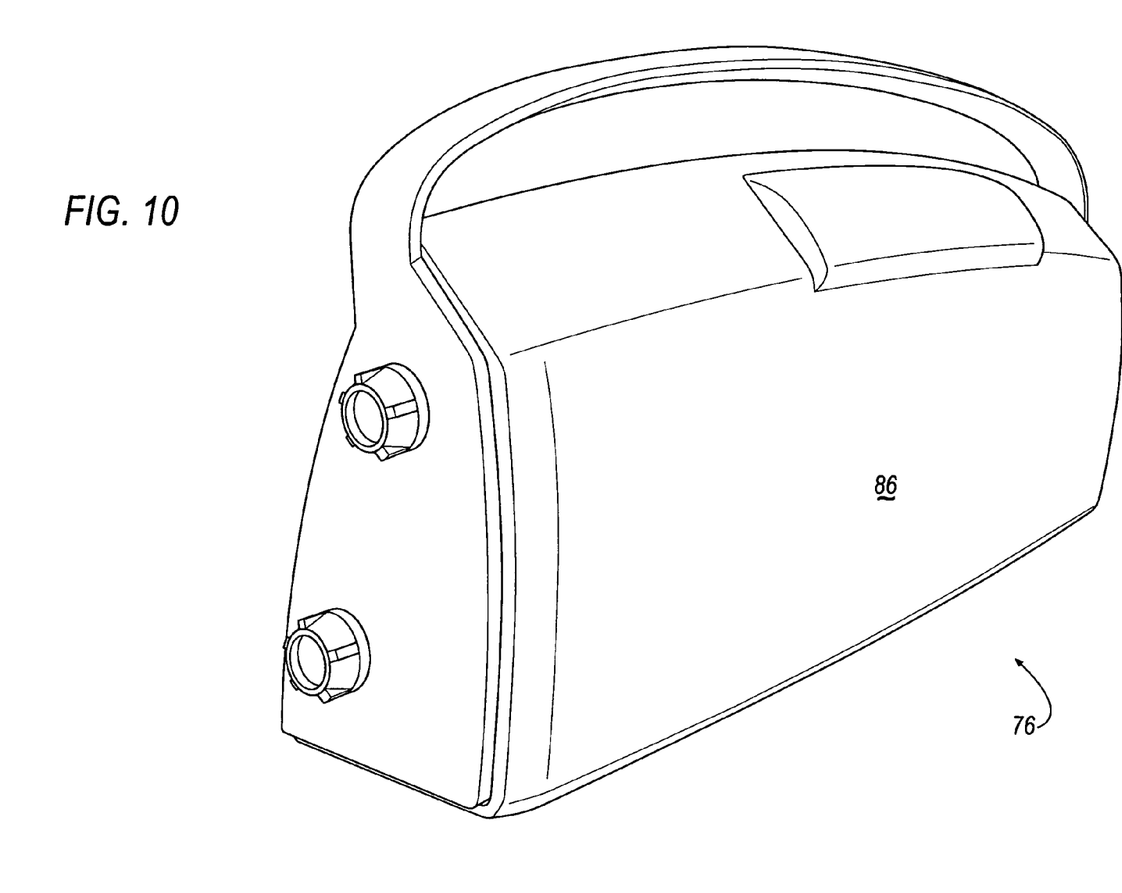
FIG. 10 is a rear perspective view of the portable entertainment device of the present invention showing the portable entertainment device completely enclosed by the clam shell case.

Now referring to FIG. 6, rubberized handle is designed as a flexible carrying strap which is attached to portable entertainment device 20. In a preferred embodiment, end portion 64, 66 of rubberized handle 62 are fashioned with receiving openings 68 through 74. Receiving opening 68 through 74 are adapted to slide over the outside periphery of the respectively associated mating cap (by way of a frictional slip fit) such that they are fully secured by way of frictional engagement around the outside periphery of the end caps of upper and lower tube 36, 38. Preferably, rubberized handle 62 is made from a flexible material so that it is easily slipped over the end caps of upper and lower tube 36, 38 while still providing a strong frictional engagement thereto. FIG. 7 shows a complete assembly of handle 62 to the end caps of upper and lower tube 36, 38.

Now referring to FIGS. 7 through 10, clam shell cover 76 includes at least one hinge element 78, used to hinge a first planar member 80 to the remaining body 82 of clam shell cover 76. Other portions of clam shell cover 76 can also be hinged to one another which might be advantageous for collapsing cover 76 into a relatively flat configuration when cover 76 is stored. Clam shell cover 76 includes a base portion 84 which is designed to engage and support stanchion 26 and 28. Back portion 86 of clam shell cover 76 is designed to generally engage the back portion of portable entertainment device 20 and first planar member 80 of clam shell cover 76 is designed to engage and cover the front portion of portable entertainment device 20. In a preferred embodiment, clam shell cover 76 slips onto portable entertainment device 20 from the bottom thereof allowing first planar member 80 to be pivoted about hinge element 78 so that the claim shell cover 76 completely encapsulates the front, bottom, and back side portions of portable entertainment device 20. Preferably, the right and left side portions of portable entertainment device 20 are not covered by clam shell cover 76 allowing rubberized handle 62 to be manipulated either on or off portable entertainment device 20 without necessitating the removal of clam shell cover 76.

While the disclosure has set forth various embodiments of the present invention, it is to be understood that the embodiments set forth herein are given by example/and are not limiting. Those skilled in the art will readily recognize that there are numerous alternative designs and embodiments for practicing the invention that do not depart from the spirit of the present invention. Thus, it is to be understood that the present invention not only covers the specific embodiments disclosed herein but extends to all fair equivalents thereof.

What is claimed as new and desired to be protected by Letters Patent of the United States is:

1. A portable entertainment device, comprising:
   a right bay, a center bay, and a left bay,
   at least one tubular element pivotally connecting the center bay to the left and right bays,
   wherein the center bay includes a first face and a second face apart from the first face, said first face comprising controls for a first electronic system permanently housed in said center bay, said second face is adapted to removably interface with a module for a second electronic system and comprises controls for said second electronic system, and
   wherein the center bay pivots relative to said left bay and said right bay between a first position wherein the first face is accessible by an operator for adjusting the controls for the first electronic system and a second position wherein the second face is accessible by the operator for the installing the module and adjusting the controls for the second system.

2. The portable entertainment device of claim 1 wherein said center bay includes means for interfacing with one of a plurality of electronic modules.

3. The portable entertainment device of claim 1, wherein the center bay includes means for accommodating a satellite receiver module.

4. The portable entertainment device of claim 1, wherein said first and second faces are on opposing sides of said center bay.

5. The portable entertainment device of claim 1, wherein said at least one tubular element includes first and second tubular elements, wherein said first tubular element includes a removable end cap, and wherein the first tubular element defines an inner chamber adapted to contain one or more batteries.

6. The portable entertainment device of claim 1, wherein at least one of said bays includes an inner chamber, wherein said inner chamber is vented through an inner chamber of said at least one tubular element to form an air passage port.

7. The portable entertainment device of claim 1, wherein said right and left bays includes stanchions.

8. The portable entertainment device of claim 1, further including a rubberized handle adapted to attach to end portions of said at least one tubular element by frictionally engaging an outer surface of said end portion or by frictionally engaging an one or more end caps affixed to said end portions of said at least one tubular element.

9. The portable entertainment device of claim 1, further including a clam shell case having at least one hinged element, wherein said clam shell cover is adapted to surround a front portion, bottom portion, and a back portion of one or more of said bays leaving a side portion of one or more of the bays uncovered.

10. The portable entertainment device of claim 6, wherein said inner chamber of at least one of said bays includes a speaker.

11. The portable entertainment device of claim 10, wherein said at least one tubular element includes an end cap, and wherein said end cap is permeable to air.

\* \* \* \* \*